H. STUEBNER.
ANTIFRICTION BEARING.
APPLICATION FILED JAN. 24, 1911.

1,068,018.

Patented July 22, 1913.
2 SHEETS—SHEET 1.

WITNESSES:

INVENTOR
Henry Stuebner
BY Charles N. Butler
ATTORNEY.

H. STUEBNER.
ANTIFRICTION BEARING.
APPLICATION FILED JAN. 24, 1911.
1,068,018.
Patented July 22, 1913.
2 SHEETS—SHEET 2.
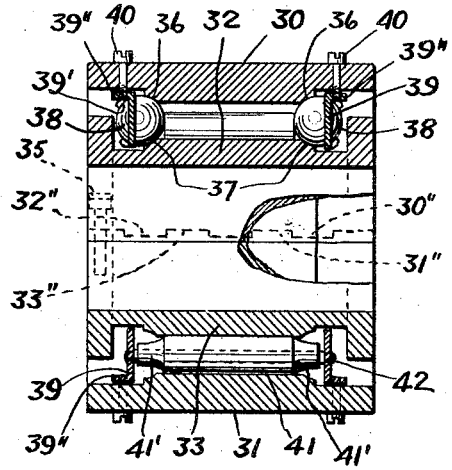
FIG. 7.
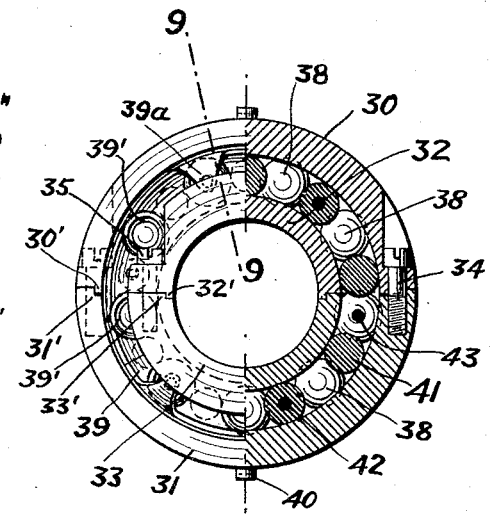
FIG. 8.
FIG. 10.
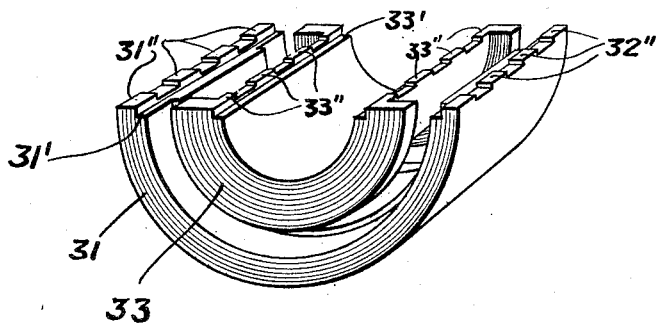
FIG. 9.
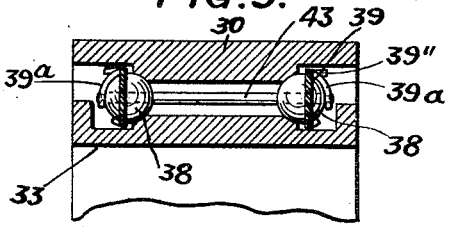
WITNESSES:
INVENTOR
Henry Stuebner
BY
ATTORNEY.

UNITED STATES PATENT OFFICE.

HENRY STUEBNER, OF PHILADELPHIA, PENNSYLVANIA.

ANTIFRICTION-BEARING.

1,068,018.

Specification of Letters Patent.

Patented July 22, 1913.

Application filed January 24, 1911. Serial No. 604,299.

*To all whom it may concern:*

Be it known that I, HENRY STUEBNER, a citizen of the United States, residing in the city of Philadelphia, county of Philadelphia, and State of Pennsylvania, have invented certain Improvements in Antifriction-Bearings, of which the following is a specification.

My invention is an antifriction bearing comprising balls alternating with rollers having end races engaging the balls, and means for holding the balls and rollers in coöperating relation.

It furthermore contemplates the use of a sectional outer bearing member or journal box for inclosing the rollers and balls, the antifriction devices being adapted to be fixed relatively to the box sections, to prevent dissociation thereof upon the separation of the bearing, by the means which hold the balls and rollers in the desired coöperating relation in the normal operation of the bearing.

The characteristic features of my invention are fully disclosed in the following description and the accompanying drawings in illustration thereof.

Figure 1:
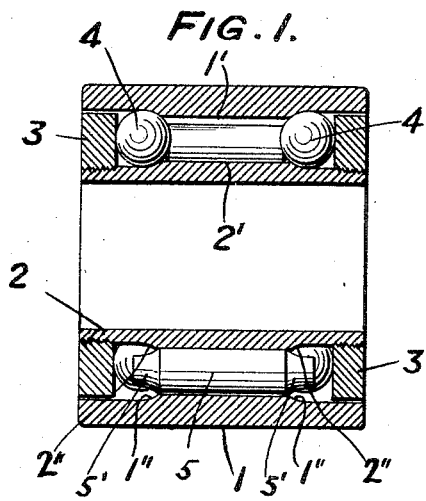
Figure 2:
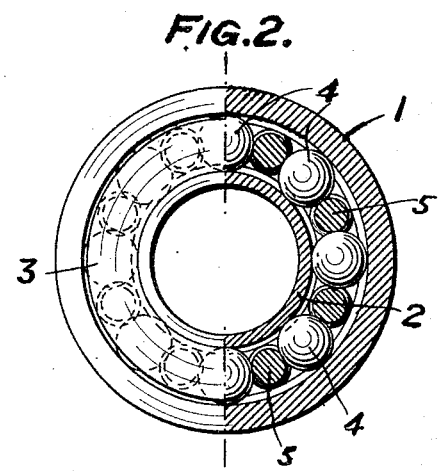
Figure 3:
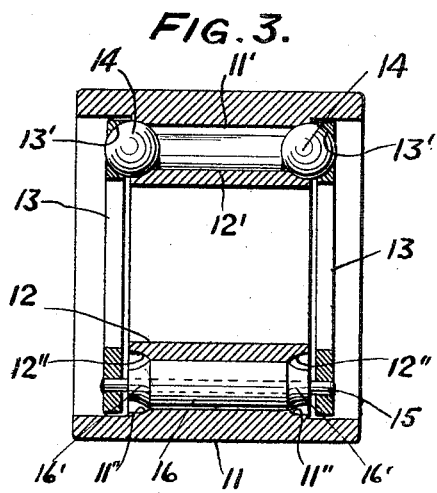
Figure 4:
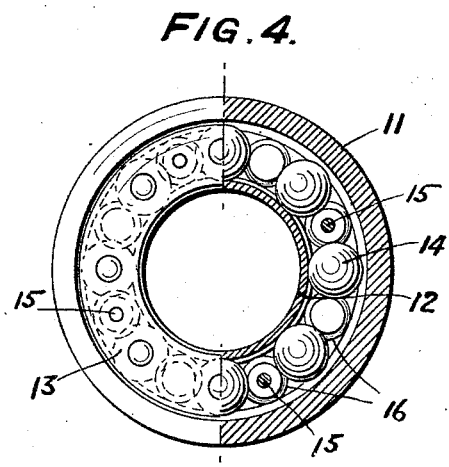
Figure 5:
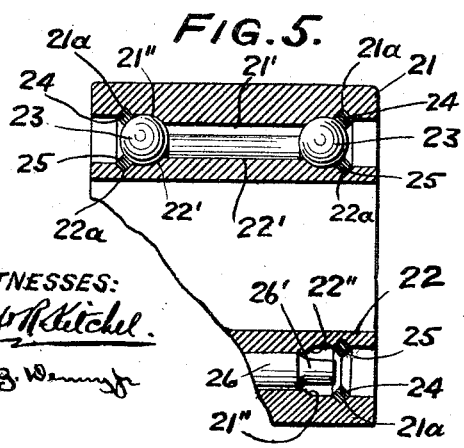
Figure 6:
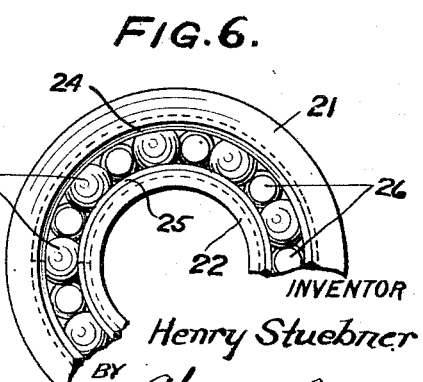

In the drawings, Figure 1 is a longitudinal sectional view and Fig. 2 is a part sectional end elevation of a bearing embodying my invention; Fig. 3 is a longitudinal sectional view and Fig. 4 is a part sectional end elevation of a second form of bearing embodying my invention; Fig. 5 is a broken longitudinal sectional view and Fig. 6 is a broken end elevation representing a third form of bearing constructed in accordance with my improvements; Fig. 7 is a longitudinal section and Fig. 8 is a part sectional end elevation of a fourth form of bearing constructed in accordance with my improvements; Fig. 9 is a section taken on the line 9—9 of Fig. 8, and Fig. 10 is a perspective view illustrating box and collar sections used in the construction shown in Figs. 7, 8, and 9.

The bearing, as illustrated in Figs. 1 and 2, comprises the journal box 1 having the ends of its cylindrical interior surface 1' intersected by the concave surfaces 1'', the shaft collar or sleeve 2 having its cylindrical outer surface 2' intersected by the concave surfaces 2'', the bearing rings 3 screwed on the ends of the collar, the balls 4 held by the ring 3 in the races formed by the concave surfaces, and the rollers 5, disposed between the box and collar, having their ends reduced to provide the concave surfaces 5' which afford races for the balls, by which the rollers are spaced. This construction is well adapted for carrying both a radial and an axial thrust.

As illustrated in Figs. 3 and 4, the box 11 has the ends of its cylindrical interior surface 11' intersected by the concave surfaces 11'' and the collar 12 has the ends of its cylindrical exterior surface 12' intersected by the concave surfaces 12''. Rings 13 are provided with spherical seats 13', and balls 14, engaged in these seats, are held by the rings in engagement with the races 11'' and 12''. Rollers 16, disposed between the box and collar, have the concave end surfaces 16' providing races for the balls alternating therewith, and rods 15, fixed to the rings 13, extend through the rollers, which are journaled thereon.

In the form illustrated in Figs. 5 and 6, the box 21 has its cylindrical surface 21' intersected by the concave surfaces 21'', the collar 22 has its cylindrical surface 22' intersected by the concave surfaces 22'' and balls 23 are held in the concentric races formed by the surfaces 21'' and 22'' by the engagement therewith of the split rings 24 and 25, which are sprung into the channels 21ª of the box and the channels 22ª of the collar. Rollers 26 have the concave end surfaces 26' which afford races for engaging the balls, which alternate with the rollers, one being spaced by the other.

In the form illustrated in Figs. 7 to 10 inclusive, the box is formed by segments 30 and 31 having the respective interlocking longitudinal beads 30' and grooves 31' to prevent lateral displacement and the respective interlocking shoulders 30'' and 31'' to prevent longitudinal displacement. The collar is similarly formed of segments 32 and 33 having the respective interlocking longitudinal beads 32' and grooves 33' to prevent lateral displacement, and the respective interlocking shoulders 32'' and 33'' to prevent longitudinal displacement. Screws 34 and 35 hold the respective box and collar segments together. The box and collar are provided with the respective races 36 and 37 for the balls 38 which are held in position by the pressed metal rings 39 formed in sections; the rings having the open seats 39' in which the balls engage and the flanges 39'' engaged by screws 40 carried by the box. Rollers 41, disposed between the box and collar, have the concave end surfaces 41' providing races engaged by adjacent balls. Rods 42 are fixed to the rings 39 and pass through rollers 41, which are journaled thereon, and rods 43 are fixed to lugs 39ª on the rings and pass through the balls 38, whereby the parts are connected together in the desired relation. With this construction, box sections having antifriction devices attached thereto may be conveniently placed on the median part of a shaft having end bearings and secured together with the screws 34, or may be separated and removed from the shaft without dissociation of the antifriction devices. By the engagement of the balls in the races formed by the concave surfaces of the box and shaft, in which they are held by the rings, the parts of the bearing are prevented from moving longitudinally relatively to each other.

Having described my invention, I claim:

1. An anti-friction bearing comprising an outer sectional bearing member having therein an intersecting cylindrical surface and circular race, rollers having circular races registering with said race first named, balls movable in said circular races, sectional rings adapted for engaging the ends of said rollers, and means for connecting the sections of said rings with the sections of said member, whereby corresponding rollers are engaged to the respective sections of said member and are retained in connection therewith when said sections are separated.

2. An anti-friction bearing comprising an outer bearing member having interlocking sections, said member having therein an intersecting cylindrical surface and ball race, an inner bearing member having interlocking sections, said last named member having thereon an intersecting cylindrical surface and circular ball race, rollers between said members engaging said cylindrical surfaces, said rollers having ball races registering with the races of said members, balls engaging said races, sectional rings, and means whereby the sections of said rings are engaged to sections of one of the aforesaid members and removable therewith, said ring sections being adapted for carrying said rollers and balls with the separated bearing sections.

3. An anti-friction bearing comprising an outer bearing member formed in separable sections, a ring formed in separable sections, means for connecting the sections of said ring with the sections of said member so that the ring sections can be adjusted axially with relation to the bearing member sections, and alternating balls and rollers adapted to be engaged to the sections of said bearing member by said ring sections.

4. An antifriction mechanism comprising an outer bearing member having a raceway groove therein, an inner bearing member having a raceway groove therein concentric with said first named groove, rollers disposed between said bearing members and having raceway grooves therein, balls disposed in said grooves, and a ring for holding said balls in place.

5. An antifriction mechanism comprising an outer bearing member having a raceway groove therein, rollers disposed within said member and having raceway grooves therein, balls disposed between said rollers in engagement with the grooves therein and in said bearing member, and rings having seats for engaging said balls and holding them in position.

6. An antifriction mechanism comprising an inner and an outer bearing member, a raceway groove in one of said members, rollers disposed between said members and having raceway grooves therein, balls disposed between said rollers and engaging the grooves therein and in said bearing members, and a ring fixed to the other of said bearing members and engaging said balls.

In witness whereof I have hereunto set my name this 19th day of January, A. D. 1911, in the presence of the subscribing witnesses.

HENRY STUEBNER.

Witnesses:
  Jos. G. Denny, Jr.,
  C. N. Butler.

---

Copies of this patent may be obtained for five cents each, by addressing the "Commissioner of Patents, Washington, D. C."